United States Patent
Park

(10) Patent No.: US 7,843,993 B2
(45) Date of Patent: Nov. 30, 2010

(54) MOVING PICTURE ENCODING APPARATUS HAVING INCREASED ENCODING SPEED AND METHOD THEREOF

(75) Inventor: Hyun-Sang Park, Cheonan-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1436 days.

(21) Appl. No.: 11/258,498

(22) Filed: Oct. 25, 2005

(65) Prior Publication Data

US 2006/0088097 A1    Apr. 27, 2006

(30) Foreign Application Priority Data

Oct. 25, 2004    (KR) ...................... 10-2004-0085383

(51) Int. Cl.
*H04N 7/12*    (2006.01)
*H04N 11/02*    (2006.01)
*H04N 11/04*    (2006.01)

(52) U.S. Cl. .............................. 375/240.03; 375/240.24

(58) Field of Classification Search .................. 375/240, 375/240.24, 240.12, 240.2, 240.23, 240.16, 375/240.03; 382/232, 236, 239, 248
See application file for complete search history.

(56) References Cited

U.S. PATENT DOCUMENTS 5,982,936 A    11/1999  Tucker et al. ................ 382/233
6,690,835 B1 *  2/2004  Brockmeyer et al. ......... 382/236
6,950,465 B1 *  9/2005  Yokoyama et al. ....... 375/240.12

FOREIGN PATENT DOCUMENTS

| JP | 11-136680 | 5/1999 |
| KR | 100174441 B1 | 4/1998 |
| KR | 1998-023060 | 6/1998 |
| KR | 100154920 B1 | 11/1998 |

* cited by examiner

*Primary Examiner*—Yon Couso
(74) *Attorney, Agent, or Firm*—F. Chau & Associates, LLC

(57) ABSTRACT

Provided are a moving picture encoding apparatus having an increased encoding speed, and a method thereof, where the moving picture encoding apparatus includes a first frame memory storing an input image divided into brightness blocks of current macroblocks, each stored in one page; a second frame memory storing a previous image divided into clusters, each including brightness blocks of a predetermined number of macroblocks and being stored in one page; a motion estimation processor reading a brightness block of a current macroblock from the first frame memory, reading a cluster corresponding to a search area of the current macroblock from a search area of the second frame memory, and calculating a motion vector of the brightness block of the current macroblock on the basis of the read brightness block of the current macroblock and the read cluster; and a motion compensation processor reading a brightness block of a macroblock, which is moved by reflecting the motion vector on the current macroblock, from the second frame memory.

20 Claims, 4 Drawing Sheets

| ACCESS LATENCY | CONVENTIONAL ART | PRESENT INVENTION |
|---|---|---|
| 0 | 320 (1) | 320 (1.000) |
| 6 | 800 (1) | 342 (0.427) |
| 12 | 1280 (1) | 364 (0.284) |

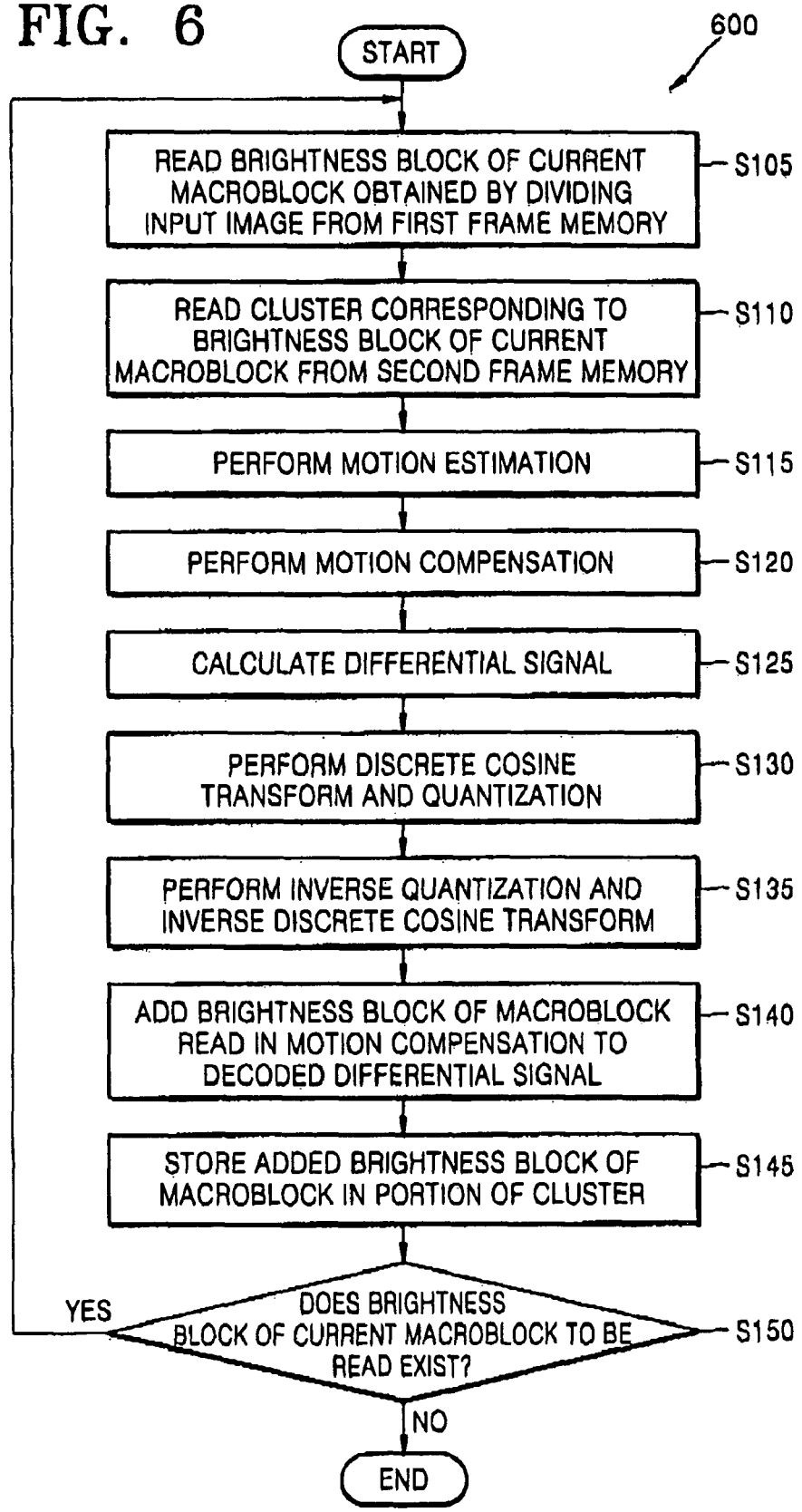

MOVING PICTURE ENCODING APPARATUS HAVING INCREASED ENCODING SPEED AND METHOD THEREOF

CROSS-REFERENCE TO RELATED APPLICATION

This application claims foreign priority under 35 U.S.C. §119 to Korean Patent Application No. 10-2004-0085383, filed on Oct. 25, 2004 in the Korean Intellectual Property Office, the disclosure of which is incorporated herein in its entirety by reference.

BACKGROUND OF THE INVENTION

1. Field of the Invention

The present disclosure relates to a moving picture encoding apparatus, and more particularly, to a moving picture encoding apparatus having an increased encoding speed, and a method thereof.

2. Description of the Related Art

In the MPEG-2, MPEG-4, and H.264 standards, an input image is divided into units of macroblocks, each having 16×16 pixels, which do not overlap, and motion estimation and compensation are performed in units of macroblocks. Discrete cosine transform and quantization are performed in units of blocks, each having 8×8 pixels. The input image is compressed by variable length coding the results.

A moving picture encoding apparatus using the MPEG-2, MPEG-4, and H.264 standards performs a decoding process, stores a decoded macroblock in a frame memory, and uses the decoded macroblock as a reference image for motion estimation when a subsequent image is encoded. An example of the moving picture encoding apparatus is disclosed in Japanese Patent Laid-Open Publication No. 1999-136680.

FIG. 1 is a block diagram of a conventional moving picture encoding apparatus 10. Referring to FIG. 1, the apparatus 10 includes a frame memory 12, an encoding unit 14, and an output buffer 16. The frame memory 12 is an input buffer, and an input image IN, which is a digital signal input from a camera system (not shown), is stored in the frame memory 12. The encoding unit 14 encodes the input image IN transmitted from the frame memory 12 in units of macroblocks. The output buffer 16 can be realized with a first-in first-out (FIFO) memory and outputs an image encoded by the encoding unit 14 as an output stream OUT.

The encoding unit 14 includes a motion estimation processor for calculating a motion vector by searching a previous image (or a previous frame) stored in an internal frame memory for a brightness block of 16×16 pixels most similar to a brightness block of a current macroblock of the input image IN, which is read from the frame memory 12. The motion estimation processor performs the most calculations (or operations) and the most frequent memory accesses in the moving picture encoding apparatus 10. The memory access is a read operation or a storage operation (write operation).

When the motion estimation processor performs motion estimation within a predetermined search range, a search area is necessary inside the frame memory included in the encoding unit 14. For example, when the search range is −16/+15 in a horizontal direction and a vertical direction, respectively, the search area is 48×48 pixels (brightness blocks of 9(=(16×2+16)×(16×2+16) pixels) macroblocks).

The 48×48 pixels are shown in FIG. 2, and indicated generally by the reference numeral 20. That is, FIG. 2 shows an example of image data stored in the search area of the frame memory included in the encoding unit 14 of FIG. 1. The search area data is stored in the frame memory included in the encoding unit 14 in a raster scan order and is also stored in a cache memory, e.g., SRAM, inside the motion estimation processor.

When the motion estimation processor performs motion estimation of the brightness block of the current macroblock, 16×48 new pixels must be read from the frame memory included in the encoding unit 14 since 32×48 pixels are stored in the cache memory included in the motion estimation processor. Here, a read time (or a read cycle) Tr required to read the pixels from the frame memory included in the encoding unit 14 is calculated by the following equation:

$$Tr=(\text{number of pixels per scan line/number of pixels per word}+L)\times\text{number of total scan lines}=(16/4+L)\times48=48(4+L)$$

In the above equation, 'word' denotes a 4-byte read unit (or a data width), and L denotes predetermined latency, i.e., access latency when access is performed from a predetermined scan line to a subsequent scan line. The scan line corresponds to image data (pixels) consecutively stored in one page of the frame memory included in the encoding unit 14.

The access latency is generated when the frame memory included in the encoding unit 14 or the frame memory 12 is DRAM, synchronous DRAM (SDRAM), or double data rate (DDR) SDRAM. That is, access to the DRAM is performed in units of pages, and continuous image data read or write is possible in a selected page. However, when a page is changed, latency occurs.

When the motion estimation processor performs motion estimation of the brightness block of the current macroblock, the motion estimation processor must read the brightness block of the current macroblock from the frame memory 12. After encoding and decoding the read brightness block of the current macroblock, the decoded brightness block of the current macroblock is stored in the frame memory included in the encoding unit 14. Therefore, an access time Tc for accessing the frame memory 12 and the frame memory included in the encoding unit 14 is calculated by the following equation:

$$Tc=(\text{number of pixels per scan line/number of pixels per word}+L)\times\text{number of scan lines per brightness block of a macroblock}\times\text{access number}=(16/4+L)\times16\times2=32(4+L)$$

In the above equation, 'access number' denotes a read and write number.

Therefore, a total memory access time Tt for the motion estimation of a brightness block of one current macroblock is calculated by the following equation:

$$Tt=Tr+Tc=48(4+L)+32(4+L)=80L+320$$

Therefore, since a brightness block of each macroblock is read/stored from/in the frame memory 12 and the frame memory included in the encoding unit 14, which are DRAMs, each having the access latency L, in an order input from the camera system (the raster scan order), an encoding time of the conventional moving picture encoding apparatus shown in FIG. 1 can include a plurality of access latencies L. As a result, a moving picture encoding speed may decrease.

SUMMARY OF THE INVENTION

The present disclosure provides a moving picture encoding apparatus having an increased encoding speed, and a method thereof.

According to an aspect of the present disclosure, there is provided a moving picture encoding apparatus comprising: a first frame memory storing an input image divided into brightness blocks of current macroblocks, each stored in one page; a second frame memory storing a previous image divided into clusters, each including brightness blocks of a predetermined number of macroblocks and being stored in one page; a motion estimation processor reading a brightness block of a current macroblock from the first frame memory, reading a cluster corresponding to a search area of the current macroblock from a search area of the second frame memory, and calculating a motion vector of the brightness block of the current macroblock on the basis of the read brightness block of the current macroblock and the read cluster; and a motion compensation processor reading a brightness block of a macroblock, which is moved by reflecting the motion vector on the current macroblock, from the second frame memory, wherein a differential signal calculated on the basis of a difference between the brightness block of the current macroblock and the brightness block of the macroblock read from the motion compensation processor is encoded, the encoded differential signal is decoded, the decoded differential signal is decoded as the current macroblock by adding the brightness block of the macroblock read by the motion compensation processor to the decoded differential signal, and the decoded current macroblock is stored in units of brightness blocks of macroblocks as a portion of a cluster to be stored in the second frame memory.

The size of the search area of the second frame memory may be determined according to a search range of the motion estimation processor, and the size of the cluster may vary according to the size of the search area of the second frame memory.

When the search range is −16/+15 in a vertical direction, the number of brightness blocks of macroblocks included in the cluster may be 3, the search area of the second frame memory may be stored in a cache memory included in the motion estimation processor, and the first and second frame memories may be DRAMs having access latency.

According to another aspect of the present disclosure, there is provided a moving picture encoding method comprising: (a) dividing an input image and reading a brightness block of a current macroblock stored in one page from a first frame memory; (b) reading a cluster of a previous image, which corresponds to a search area of the current macroblock and is stored in one page, from a search area of a second frame memory; (c) performing motion estimation based on the brightness block of the current macroblock read in operation (a) and the cluster read in operation (b), and performing motion compensation by reading a brightness block of a macroblock, which is moved by reflecting a motion vector calculated by the motion estimation on the current macroblock, from the second frame memory; (d) calculating a differential signal between the brightness block of the macroblock read by the motion compensation of operation (c) and the brightness block of the current macroblock read in operation (a) and encoding the differential signal; (e) decoding the differential signal encoded in operation (d) and decoding the current macroblock by adding the brightness block of the macroblock read by the motion compensation of operation (c) to the decoded differential signal; (f) storing a brightness block of the decoded current macroblock in a portion of a cluster to be stored in the second frame memory; and (g) repeating operations (a), (b), (c), (d), (e), and (f) until no further brightness block of a current macroblock to be read from the input image of operation (a) exists.

The size of the search area of the second frame memory in operation (b) may be determined according to a search range of the motion estimation, and the size of the cluster in operation (b) may vary according to the size of the search area of the second frame memory.

When the search range is −16/+15 in a vertical direction, the number of brightness blocks of macroblocks included in the cluster may be 3, the search area of the second frame memory may be stored in a cache memory included in a motion estimation processor performing the motion estimation, and the first frame memory of operation (a) and the second frame memory of operation (b) may be DRAMs having access latency.

In order to perform motion estimation, a moving picture encoding apparatus and method according to the present disclosure can read a brightness block of a current macroblock stored in one page from a first frame memory and read a cluster stored in one page from a second frame memory. Accordingly, memory access time can be reduced. Therefore, moving picture encoding speed can be increased.

BRIEF DESCRIPTION OF THE DRAWINGS

The above and other features and advantages of the present disclosure will become more apparent by describing in detail exemplary embodiments thereof with reference to the attached drawings in which:

FIG. 6 is a flowchart illustrating a moving picture encoding method according to an embodiment of the present disclosure.

DETAILED DESCRIPTION OF PREFERRED EMBODIMENTS

Hereinafter, the present disclosure will be described more fully with reference to the accompanying drawings, in which embodiments of the disclosure are shown. Throughout the drawings, like elements may be denoted by like reference numbers.

Figure 1:
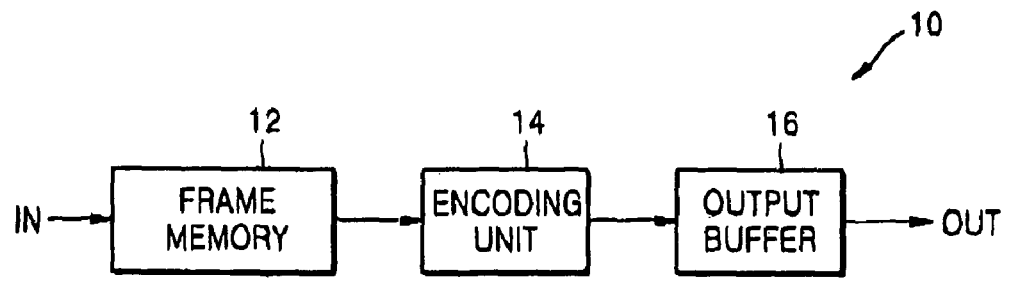
FIG. 1 is a block diagram of a conventional moving picture encoding apparatus.
Figure 2:
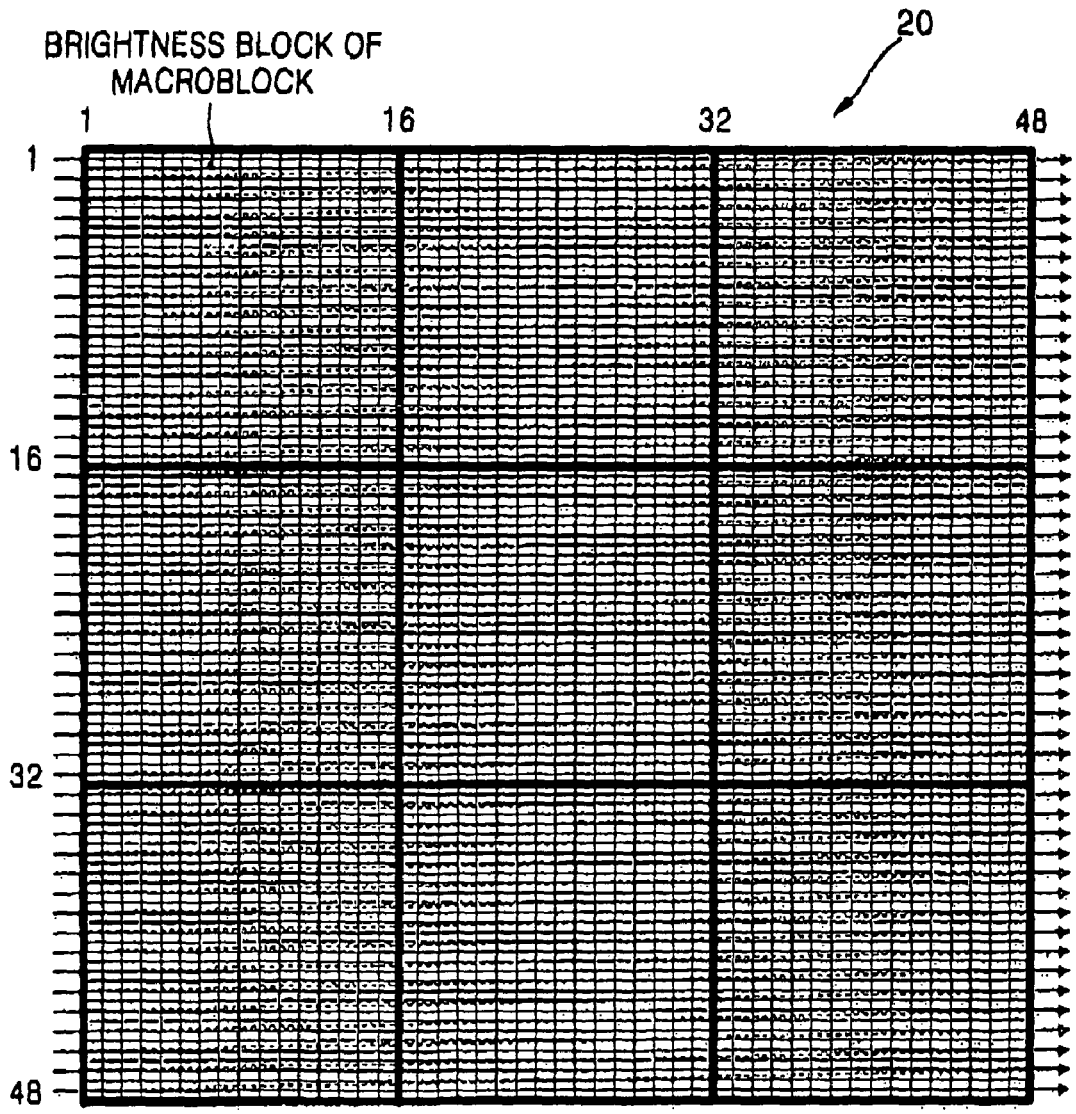
FIG. 2 is a data diagram that shows an example of image data stored in a frame memory included in an encoding unit of FIG. 1.
Figure 3:
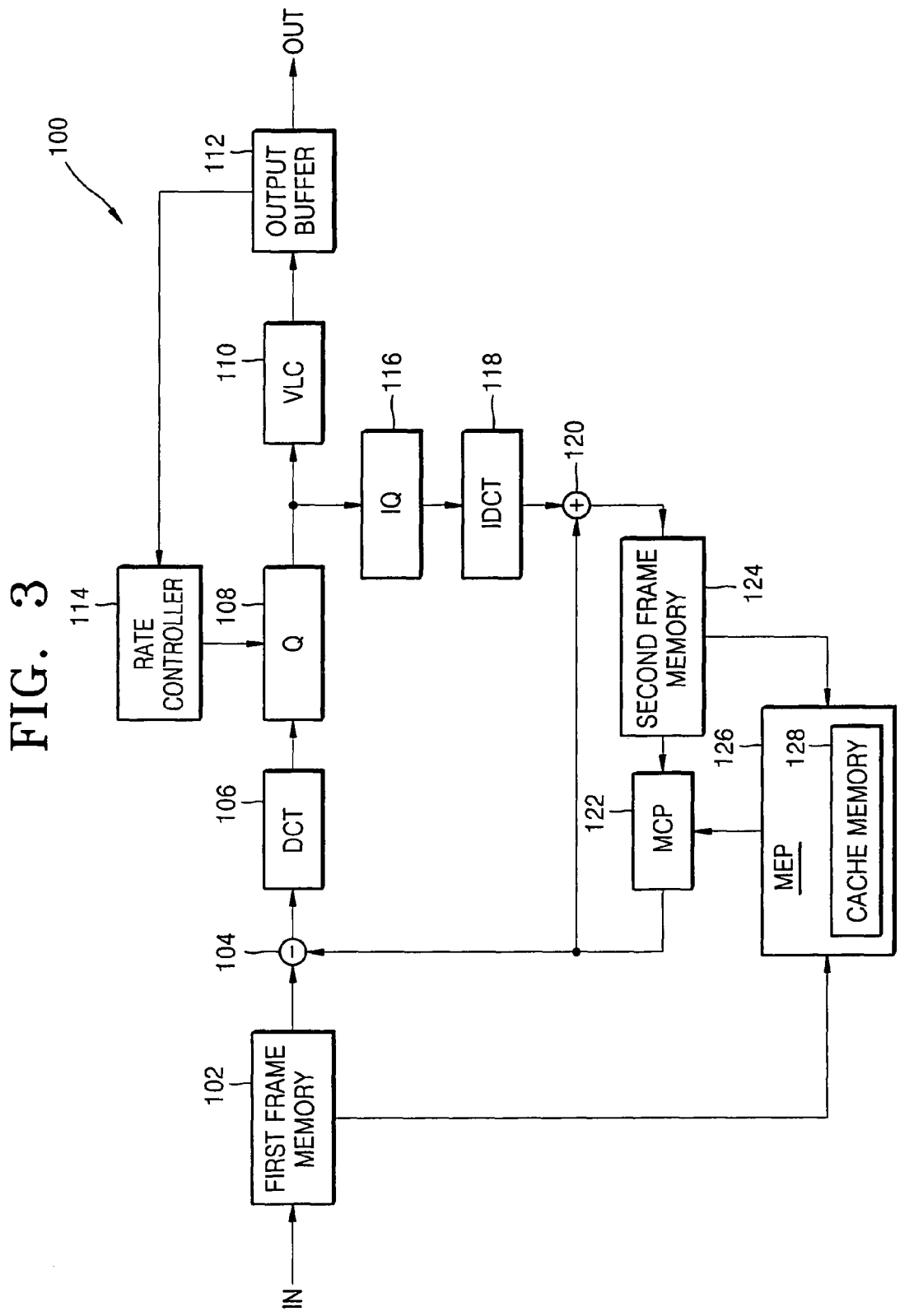
FIG. 3 is a block diagram of a moving picture encoding apparatus according to an embodiment of the present disclosure.

FIG. 3 is a block diagram of a moving picture encoding apparatus 100 according to an exemplary embodiment of the present disclosure.

Referring to FIG. 3, the moving picture encoding apparatus 100 includes a first frame memory 102, a subtracter 104, a discrete cosine transformer (DCT) 106, a quantizer (Q) 108, a variable length coder (VLC) 110, an output buffer 112, a rate controller 114, an inverse Q (IQ) 116, an inverse DCT (IDCT) 118, an adder 120, a motion compensation processor (MCP) 122, a second frame memory 124, and a motion estimation processor (MEP) 126.

The first frame memory 102 is an input buffer and may be DRAM having access latency, and an input image IN, which is a digital signal input from a camera system (not shown), is stored in the first frame memory. The input image IN is divided into brightness blocks of current macroblocks, each stored in one page. The page corresponds to a scan line, and image data (pixels) is consecutively stored in the page.

The second frame memory 124 may be DRAM having access latency, and a previous image (or a previous frame) divided into clusters is stored in the second frame memory 124. Each cluster includes brightness blocks of a predetermined number of macroblocks, is stored in one page, and corresponds to a search area of the current macroblock when motion estimation of the current macroblock is performed.

The size of the cluster can be changed according to the size of a search area of the second frame memory 124. For example, when a search range of the MEP 126 is −16/+15 in a vertical direction, the cluster can include brightness blocks of 3 macroblocks.

The MEP 126 calculates a motion vector by searching a previous image (or a previous frame) stored in the second frame memory 124 for a brightness block of 16×16 pixels most similar to a brightness block of a current macroblock of the input image IN, which is read from the first frame memory 102.

The MCP 122 reads a brightness block of a macroblock, which is moved by reflecting the motion vector on the brightness block of the current macroblock, from the previous image stored in the second frame memory 124.

The subtracter 104 calculates a differential signal between the brightness block of the macroblock read by the MCP 122 and the brightness block of the current macroblock. The differential signal is encoded by processing through the DCT 106, the Q 108, and the VLC 110. The encoded differential signal is output to the output buffer 112. The output buffer 112 can be realized as a FIFO memory and outputs the encoded differential signal as an output stream OUT. The rate controller 114 determines (controls) a quantization degree of a brightness block of a subsequent macroblock based on an amount of a bitstream stored in the output buffer 112.

The encoded differential signal is decoded by the IQ 116 and the IDCT 118. The adder 120 decodes the current macroblock by adding the brightness block of the macroblock read by the MCP 122 to the decoded differential signal. A brightness block of the decoded current macroblock is search area data used for motion estimation of a subsequent image (or a subsequent frame) and is stored in a portion of a cluster to be decoded in the second frame memory 124.

When the MEP 126 performs motion estimation in a predetermined search range, a search area is needed inside the second frame memory 124. The size of the search area of the second frame memory 124 is determined according to the search range of the MEP 126. For example, when the search range is −16/+15 in a horizontal direction and a vertical direction, respectively, the search area is 48×48 pixels, i.e., brightness blocks of 9 (=(16×2+16)×(16×2+16) pixels) macroblocks.

Figures 4, 5:
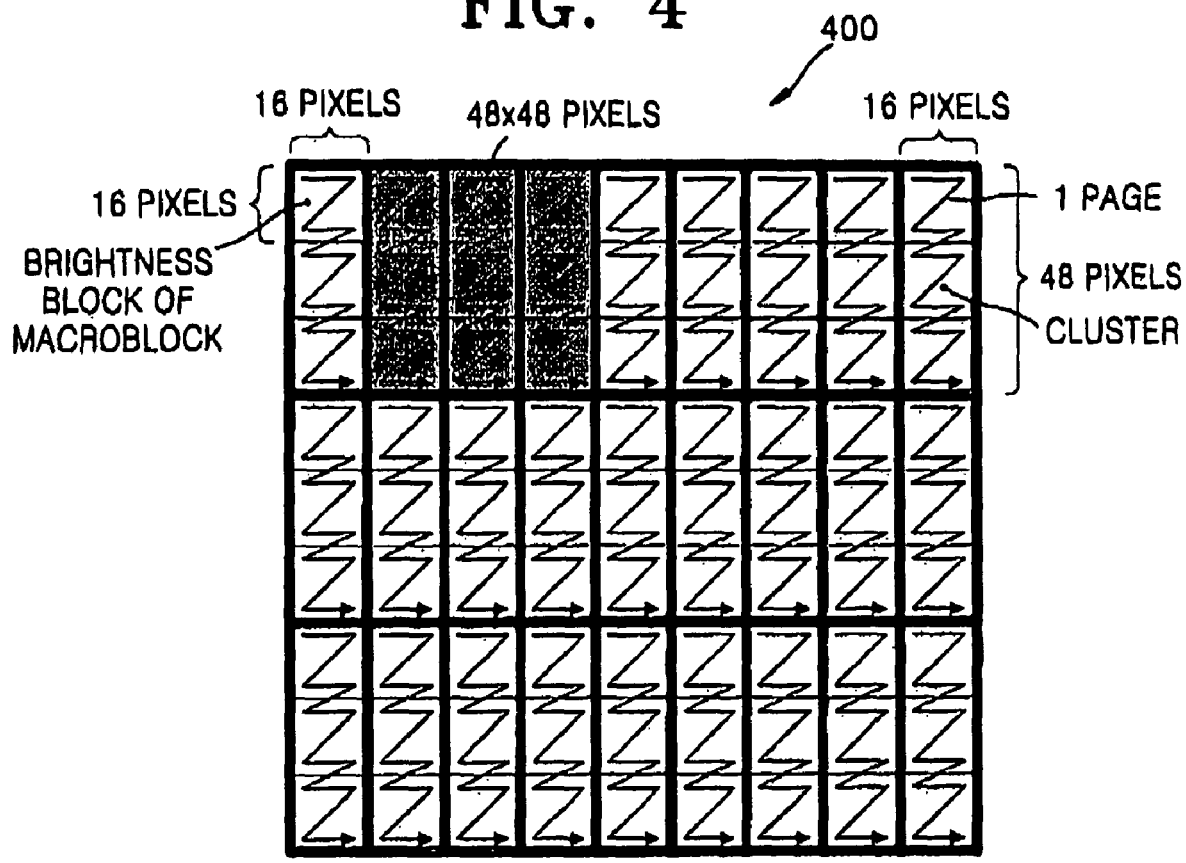
FIG. 4 is a data diagram that shows an example of image data including a search area of a second frame memory according to an embodiment of the present disclosure.
FIG. 5 is a comparison table listing memory access times for brightness blocks of each macroblock for motion estimation according to the present disclosure versus motion estimation according to conventional art.

Image data including the 48×48 pixels are shown in FIG. 4, and indicated generally by the reference numeral 400. That is, FIG. 4 shows an example of the image data stored in the search area of the frame memory 124. The search area data exists at an optional location, is divided into clusters, each including brightness blocks of 3 macroblocks, and is stored in a cache memory 128, e.g., SRAM, inside the MEP 126. Each cluster is image data having 3×16×16=768 pixels and is consecutively (or sequentially) stored in one page of the second frame memory 124.

When the MEP 126 performs motion estimation of the brightness block of the current macroblock, a new 16×48 pixels must be read from the second frame memory 124 since 32×48 pixels are stored in the cache memory 128 inside the MEP 126. Here, a total memory access time for motion estimation of a brightness block of an optional current macroblock is described in two cases.

In the first case, a brightness block of a macroblock required for the motion estimation of the brightness block of the current macroblock corresponds to a brightness block located in the middle of brightness blocks of three macroblocks included in the cluster. Here, since the read cluster is stored in one page of the second frame memory 124, a read time (or read cycle) Tr1 required to read the cluster from the second frame memory 124 is calculated by the following equation:

$$Tr1 = (\text{number of pixels per cluster})/(\text{number of pixels per word}) + L = (768/4 + L) = 192 + L$$

In the above equation, 'word' denotes a 4-byte read unit (or data width), and L denotes predetermined latency, i.e., access latency when access is performed from a predetermined scan line to a subsequent scan line. The scan line corresponds to image data (pixels) consecutively stored in one page of the first frame memory 102 or the second frame memory 124. The cluster includes brightness blocks of three macroblocks.

When the MEP 126 performs the motion estimation of the brightness block of the current macroblock, the MEP 126 must read the brightness block of the current macroblock from the first frame memory 102. After encoding and decoding the read brightness block of the current macroblock, the decoded brightness block of the current macroblock is stored in the second frame memory 124. Therefore, an access time Tc1 for accessing the first and second frame memories 102 and 104 is calculated by the following equation:

$$Tc1 = (\text{number of pixels per brightness block of current macroblock}/\text{number of pixels per word} + L) \times \text{access number} = (256/4 + L) \times 2 = 2(64 + L)$$

In the above equation, 'access number' denotes a read and write number.

Therefore, in the first case, a total memory access time Tt1 for the motion estimation of a brightness block of one current macroblock is calculated by the following equation:

$$Tt1 = Tr1 + Tc1 = 192 + L + 2(64 + L) = 3L + 320$$

In the second case, a brightness block of a macroblock required for the motion estimation of the brightness block of the current macroblock corresponds to a brightness block located at the top or bottom among brightness blocks of three macroblocks included in the cluster. Here, since the read cluster is separately stored in two pages of the second frame memory 124, a read time Tr2 required to read the cluster from the second frame memory 124 is calculated by the following equation:

$$Tr2 = (256/4 + L) + (512/4 + L) = 2L + 192$$

When the MEP 126 performs the motion estimation of the brightness block of the current macroblock, the MEP 126 must read the brightness block of the current macroblock from the first frame memory 102. After encoding and decoding the read brightness block of the current macroblock, the decoded brightness block of the current macroblock is stored in the second frame memory 124. Therefore, an access time Tc2 for accessing the first and second frame memories 102 and 104 is calculated by the following equation:

$$Tc2 = (\text{number of pixels per brightness block of current macroblock}/\text{number of pixels per word} + L) \times \text{access number} = (256/4 + L) \times 2 = 2(64 + L)$$

Therefore, in the second case, a total memory access time Tt2 for the motion estimation of a brightness block of one current macroblock is calculated by the following equation:

$$Tt2 = Tr2 + Tc2 = 192 + 2L + 2(64+L) = 4L + 320$$

A proportion of the brightness block of the current macroblock corresponding to the first case is ⅓, and a proportion of the brightness block of the current macroblock corresponding to the second case is ⅔. Accordingly, an average memory access time Ta for the motion estimation of a brightness block of one current macroblock is calculated by the following equation:

$$Ta = (Tt \cdot 1/3 + 2 \times Tt2/3) = 3.67L + 320$$

FIG. 5 is a table indicated generally by the reference numeral 500, listing a memory access time for a brightness block of each macroblock for motion estimation according to the present disclosure and according to a conventional art. In FIG. 5, the memory access time according to the access latency L is calculated by the equation Tt=80L+320 for the conventional art and the equation Ta=3.67L+320 for the present disclosure.

Referring to FIG. 5, when the access latency L is 0, there is no difference between memory access times of the conventional art and the present disclosure. When the access latency L is 6, the memory access time of the present disclosure is about 57.2% lower than the conventional art. When the access latency L is 12, the memory access time of the present disclosure is about 71.5% lower than the conventional art.

For motion estimation, the moving picture encoding apparatus according to the present disclosure can read a brightness block of a current macroblock stored in one page from the first frame memory 102 and read a cluster stored in one page from the second frame memory 124. Accordingly, memory access time can be reduced. Therefore, a moving picture encoding speed can be increased.

FIG. 6 is a flowchart indicated generally by the reference numeral 600, illustrating a moving picture encoding method according to an embodiment of the present disclosure. The moving picture encoding method can be applied to the moving picture encoding apparatus illustrated in FIG. 3.

In operation S105, the MEP 126 reads a brightness block of a current macroblock obtained by dividing an input image from the first frame memory 102. The brightness block of the current macroblock is stored in one page of the first frame memory 102. The first frame memory 102 is DRAM having the access latency L.

In operation S110, the MEP 126 reads a cluster of a previous image, which includes brightness blocks of macroblocks most similar to (or corresponding to) the brightness block of the current macroblock, from the second frame memory 124. The cluster corresponds to a search area of the current macroblock when motion estimation of the current macroblock is performed, and is stored in one page of the second frame memory 124. The second frame memory 124 is DRAM having the access latency L.

The size of a search area of the second frame memory 124 is determined according to a search range of the MEP 126, and the search area of the second frame memory 124 is stored in the cache memory 128 included in the MEP 126. The size of the cluster varies according to the size of the search area of the second frame memory 124. When the search range of the MEP 126 is −16/+15 in the vertical direction, the cluster can include brightness blocks of 3 macroblocks, for example.

In operation S115, the MEP 126 performs motion estimation based on the brightness block of the current macroblock read in operation S105 and the cluster read in operation S110.

In operation S120, the MCP 122 reads a brightness block of a macroblock which is moved as far as a motion vector output in operation S115, from the second frame memory 124.

In operation S125, the subtracter 104 calculates a differential signal between the brightness block of the current macroblock read in operation S105 and the brightness block of the macroblock read in operation S120.

In operation S130, the DCT 106, the Q 108, and the VLC 110 encode the differential signal by discrete-cosine-transforming, quantizing, and variable-length-coding the differential signal.

In operation S135, the IQ 116 and the IDCT 118 decode the differential signal encoded by the DCT 106 and the Q 108.

In operation S140, the adder 120 decodes the current macroblock by adding the brightness block of the macroblock read in operation S120 to the decoded differential signal.

In operation S145, a brightness block of the decoded current macroblock is stored in a portion of a cluster to be stored in the second frame memory 124. In operation S150, it is determined whether a brightness block of a current macroblock to be read from the first frame memory 102 exists. When the current macroblock to be read exists in the first frame memory 102, the above procedures are repeated from operation S105. When the current macroblock to be read does not exist in the first frame memory 102, the moving picture encoding method is finished.

As described above, in order to perform motion estimation, the moving picture encoding method according to the present disclosure can read a brightness block of a current macroblock stored in one page from a first frame memory and read a cluster stored in one page from a second frame memory. Accordingly, memory access time can be reduced. Therefore, moving picture encoding speed can be increased.

While this invention has been particularly shown and described with reference to preferred embodiments thereof, it will be understood by those skilled in the art that various changes in form and details may be made therein without departing from the spirit and scope of the invention as defined by the appended claims and their equivalents.

What is claimed is:

1. A moving picture encoding apparatus comprising:
    a first frame memory for storing an input image divided into brightness blocks of current macroblocks, each stored in one page;
    a second frame memory for storing a previous image divided into clusters, each including brightness blocks of a predetermined number of macroblocks and being stored in one page;
    a motion estimation processor for reading a brightness block of a current macroblock from the first frame memory, reading a cluster corresponding to a search area of the current macroblock from a search area of the second frame memory, and calculating a motion vector of the brightness block of the current macroblock on the basis of the read brightness block of the current macroblock and the read cluster; and
    a motion compensation processor for reading a brightness block of a macroblock, which is moved by using the motion vector to compensate the current macroblock, from the second frame memory,
    wherein a differential signal calculated on the basis of a difference between the brightness block of the current macroblock and the brightness block of the macroblock read from the motion compensation processor is encoded, the encoded differential signal is decoded, the decoded differential signal is decoded as the current macroblock by adding the brightness block of the macroblock read from the motion compensation processor to the decoded differential signal, and the decoded current macroblock is stored in units of brightness blocks of macroblocks as a portion of a cluster to be stored in the second frame memory.

2. The apparatus of claim 1, wherein, when the size of the search area of the second frame memory is determined according to a search range of the motion estimation processor.

3. The apparatus of claim 2, wherein the size of the cluster varies according to the size of the search area of the second frame memory.

4. The apparatus of claim 3, wherein when the search range is −16/+15 in a vertical direction, the number of brightness blocks of macroblocks included in the cluster is 3.

5. The apparatus of claim 4, wherein the search area of the second frame memory is stored in a cache memory included in the motion estimation processor.

6. The apparatus of claim 1, wherein the first and second frame memories are DRAMs having access latency.

7. The apparatus of claim 1, wherein the encoding of the differential signal comprises discrete cosine transform, quantization, and variable length coding.

8. The apparatus of claim 1, wherein the decoded differential signal is generated by inverse quantization and inverse discrete cosine transform.

9. A moving picture encoding method comprising:
  (a) dividing an input image and reading a brightness block of a current macroblock stored in one page from a first frame memory;
  (b) reading a cluster of a previous image, which corresponds to a search area of the current macroblock and is stored in one page, from a search area of a second frame memory;
  (c) using a motion estimation processor to performing motion estimation based on the brightness block of the current macroblock read in operation (a) and the cluster read in operation (b), and using a motion compensation processor to performing motion compensation by reading a brightness block of a macroblock, which is moved by using a motion vector calculated by the motion estimation to compensate the current macroblock, from the second frame memory;
  (d) calculating a differential signal between the brightness block of the macroblock read by the motion compensation of operation (c) and the brightness block of the current macroblock read in operation (a) and encoding the differential signal;
  (e) decoding the differential signal encoded in operation (d) and decoding the current macroblock by adding the brightness block of the macroblock read by the motion compensation of operation (c) to the decoded differential signal;
  (f) storing a brightness block of the decoded current macroblock in a portion of a cluster to be stored in the second frame memory; and
  (g) repeating operations (a), (b), (c), (d), (e), and (f) until no further brightness block of a current macroblock to be read from the input image of operation (a) exists.

10. The method of claim 9, wherein the size of the search area of the second frame memory in operation (b) is determined according to a search range of the motion estimation.

11. The method of claim 10, wherein the size of the cluster in operation (b) varies according to the size of the search area of the second frame memory.

12. The method of claim 11, wherein when the search range is −16/+15 in a vertical direction, the number of brightness blocks of macroblocks included in the cluster is 3.

13. The method of claim 12, wherein the search area of the second frame memory is stored in a cache memory included in a motion estimation processor performing the motion estimation.

14. The method of claim 9, wherein the first frame memory of operation (a) and the second frame memory of operation (b) are DRAMs having access latency.

15. The method of claim 9, wherein the encoding of the differential signal comprises discrete cosine transform, quantization, and variable length coding.

16. The method of claim 9, wherein the decoded differential signal is generated by inverse quantization and inverse discrete cosine transform.

17. A moving picture encoder comprising:
  a first memory having a plurality of pages, each page disposed for storing a brightness block of a macroblock of a current input image;
  a second memory in signal communication with the first memory, the second memory having a plurality of pages, each page disposed for storing a cluster of brightness blocks from a plurality of macroblocks of a previous input image;
  a motion estimator in signal communication with the first and second memories, the motion estimator disposed for reading a brightness block of a current macroblock from the first memory, reading a cluster corresponding to a search area of the current macroblock from a search area of the second memory, and providing a motion vector of the brightness block of the current macroblock responsive to the read brightness block of the current macroblock and the read cluster; and
  a motion compensator in signal communication with the motion estimator and the second memory, the motion compensator disposed for reading a brightness block of a macroblock from the second memory and moving the brightness block by using the motion vector to compensate the current macroblock.

18. An encoder as defined in claim 17 wherein a differential signal responsive to a difference between the brightness block of the current macroblock and the brightness block of the macroblock read from the motion compensator is encoded, the encoded differential signal is decoded, the decoded differential signal is decoded as the current macroblock by adding the brightness block of the macroblock read from the motion compensation processor to the decoded differential signal, and the decoded current macroblock is stored in units of brightness blocks of macroblocks as a portion of a cluster to be stored in the second memory.

19. An encoder as defined in claim 17, further comprising a cache memory in signal communication with the motion estimator for storing the search area of the second memory.

20. An encoder as defined in claim 17, further comprising a rate controller disposed for controlling a quantization degree of a brightness block of a subsequent macroblock in response to an amount of bitstream data stored in an output buffer.

* * * * *